April 10, 1934.   D. O. ADAMS   1,954,278
FEEDING MECHANISM FOR CONVEYING SYSTEMS
Filed Jan. 12, 1932   6 Sheets-Sheet 1

Fig. 1

Inventor
Dewey O. Adams, dec'd
by Charles A. Adams, Ad'tor
By Paul, Paul & Moore
ATTORNEYS

Fig.2

April 10, 1934.　　　D. O. ADAMS　　　1,954,278

FEEDING MECHANISM FOR CONVEYING SYSTEMS

Filed Jan. 12, 1932　　6 Sheets-Sheet 3

Inventor
Dewey O. Adams, dec'd
by Charles A. Adams, Ad'tor

ATTORNEYS

Fig. 6

April 10, 1934.  D. O. ADAMS  1,954,278

FEEDING MECHANISM FOR CONVEYING SYSTEMS

Filed Jan. 12, 1932  6 Sheets-Sheet 6

Fig. 7

Inventor
Dewey O. Adams, dec'd
by Charles A. Adams, Adm'tor

By
ATTORNEYS

Patented Apr. 10, 1934

1,954,278

UNITED STATES PATENT OFFICE

1,954,278

FEEDING MECHANISM FOR CONVEYING SYSTEMS

Dewey O. Adams, deceased, late of Ellwood City, Pa., by Charles A. Adams, administrator, Ellwood City, Pa., assignor to Mathews Conveyer Company, Ellwood City, Pa., a corporation of Pennsylvania Application January 12, 1932, Serial No. 586,154

11 Claims. (Cl. 198—21)

This invention relates to an improved feeding mechanism adapted for use in connection with conveying systems in general.

An object of the invention is to provide in combination with a conveying system comprising an article carrying member and a driving means therefor, a mechanism for automatically feeding articles to a position to be engaged by the article carrying member, said mechanism having means for operating it in timed relation with respect to said member.

A further object is to provide a feeding mechanism adapted for use in connection with a conveying system to receive articles from one conveyer and deliver them, one at a time, to a suitable receiving means such as a power driven elevator, or a horizontal or an inclined conveyer; and which mechanism comprises a plurality of pushers adapted for intermittent movement, and provided with a driving mechanism operatively connected with the power means of the receiving means, said driving means being adapted to operate in timed relation with respect to the receiving means.

Other objects of the invention reside in the provision of an automatic feeding mechanism adapted for use in connection with a conveying system, to receive articles from a suitable source and deliver them to a receiving means in spaced relation, and the operation of said feeding mechanism being dependent upon the operation of the receiving means; in the provision of a feeding mechanism comprising a conveyer section adapted to receive articles from a suitable source and having means for intermittently and successively discharging articles from said conveyer section onto a power driven receiving means, and the driving means of said feeding mechanism being operatively connected with the driving means of said receiving means whereby the articles will be delivered to said receiving means in timed relation to the travel thereof; in the provision of an automatic feeding unit adapted to be situated adjacent to a receiving means and operatively connected therewith, said feeding unit having a connection with a conveyer adapted to deliver articles thereto from a source of supply, and said feeding unit being provided with a driving means, the operation of which is controlled by the travel of said receiving means whereby the feeding unit will operate in timed relation with respect thereto; in the provision of an automatic feeding unit having a independent drive, the operation of which is controlled by the traveling movement of a suitable receiving means; and, in the provision of a feeding unit which may readily be adapted for use in connection with practically all types of conveying systems.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the selected embodiment of the invention here shown, there is illustrated for purposes of disclosure, a vertical lift elevator comprising an endless chain 2—2 supported upon suitable sprockets 3—3 at the lower portion of the structure, and by suitable means, not shown, at the upper end of the structure. A plurality of article-carrying members 4 are shown pivotally suspended from the conveyer chains 2—2 and are adapted to receive articles from the feeding mechanism and deliver them to another elevation or station. The conveyer chains 2—2 and sprockets 3—3 are shown supported upon a suitable structural frame comprising uprights 5 and 6. The vertical runs of the chains operate between suitable guides formed by the uprights 5, 6, and suitable angle iron rails 7, as best shown in Figure 1.

Figure 1:
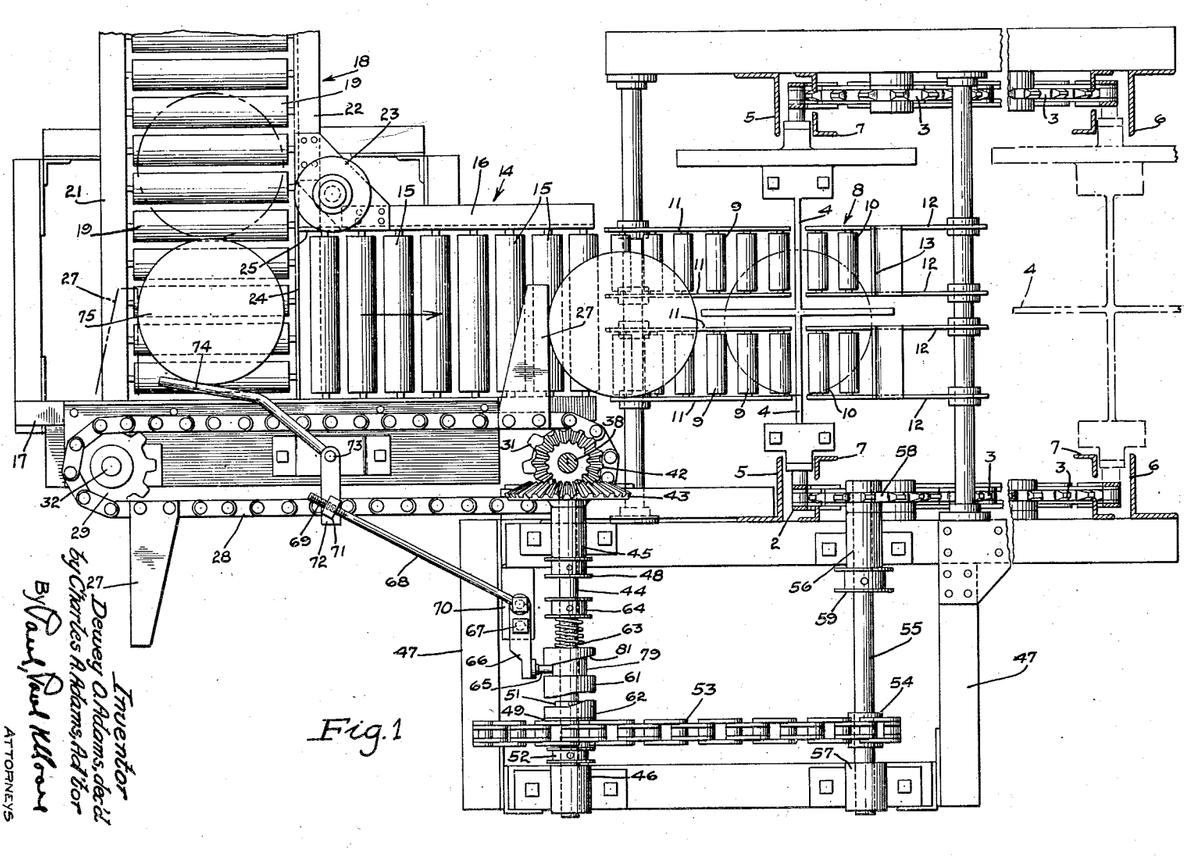
Figure 1 is a plan view showing the feeding unit operatively connected with a receiving means of the vertical lift type comprising an endless chain providing with suitable article-carrying members.

The elevator is provided at its lower portion with a suitable "receiving station" indicated generally by the numeral 8, and comprising a plurality of gravity conveyer rollers 9 and 10 supported between suitable side rails 11—11 and 12—12, as best shown in Figure 1. Suitable stops 13 are secured to the rails 12–12 adapted to be engaged by articles delivered onto the receiving station 8, as will readily be understood by reference to Figure 2. In Figure 1, the article-carrying members 4 have been shown as being cross-shaped, and adapted to pass between the conveyer sections of the receiving station 8, so that when an article is positioned upon the rollers 9 and 10 of said station, it will be engaged by an article-carrying member 4 and carried upwardly thereby.

The novel feeding unit or mechanism disclosed in this invention is shown comprising a conveyer section 14 having a plurality of anti-friction rollers 15 supported in suitable side rails 16 and 17. A suitable conveyer 18 is shown having one end connected with the feeding unit and may lead therefrom to a suitable supply source. The delivery conveyer 18 is preferably of the gravity roller type and comprises a plurality of anti-friction rollers 19 supported in suitable side rails 21 and 22, which rails may be suitably secured to the side rails 17 and 16, respectively, of the conveyer section 14. The side rails 16, 17, 21, and 22 have their upper portions extending above the upper portions of the rollers 15 and 19 so as to provide means for retaining the articles upon the conveyers, as will readily be understood by reference to Figure 3.

A suitable wheel or roller 23 is mounted at the point where the one end of the side rail 16 of the conveyer 14 connects with the side rail 22 of the conveyer 18. The periphery of the roller 23 projects beyond the inner faces of the rails 16 and 18 so as to be engaged by articles being diverted from the conveyer 18 onto the conveyer section 14. It is to be understood that the portion 24 of the side rail 22 has a portion of its upper web cut away so that the rail will not interfere with articles being diverted from the conveyer 18 onto the conveyer section 14. In like manner, the end portion 25 of the side rail 16 of the conveyer 14 is cut away to prevent it from interfering with commodities diverted from the conveyer 18 to the conveyer 14. The conveyers 14 and 18 are shown supported upon a suitable structural frame, indicated generally by the numeral 26, as shown in Figures 2 and 3.

The means for feeding articles from the delivery conveyer 18 to the article-carrying member 4 of the elevator, is shown comprising a pair of pusher blades 27 secured to an endless chain 28 supported upon a pair of spaced sprockets 29 and 31. The sprocket 29 is shown secured to one end of a suitable shaft 32 rotatably mounted in suitable bearings 33 and 34 secured to angle irons 35 and 36, respectively, as best shown in Figure 3. The angle iron 35 is suitably secured to the side rail 17 of the conveyer section 14 and the upright flange 37 thereof provides a stop for articles delivered to the feeding mechanism, as will be clearly understood by reference to Figures 1 and 3. The angle iron 36 is shown secured to the upper portion of the structural frame 26.

Figure 2:
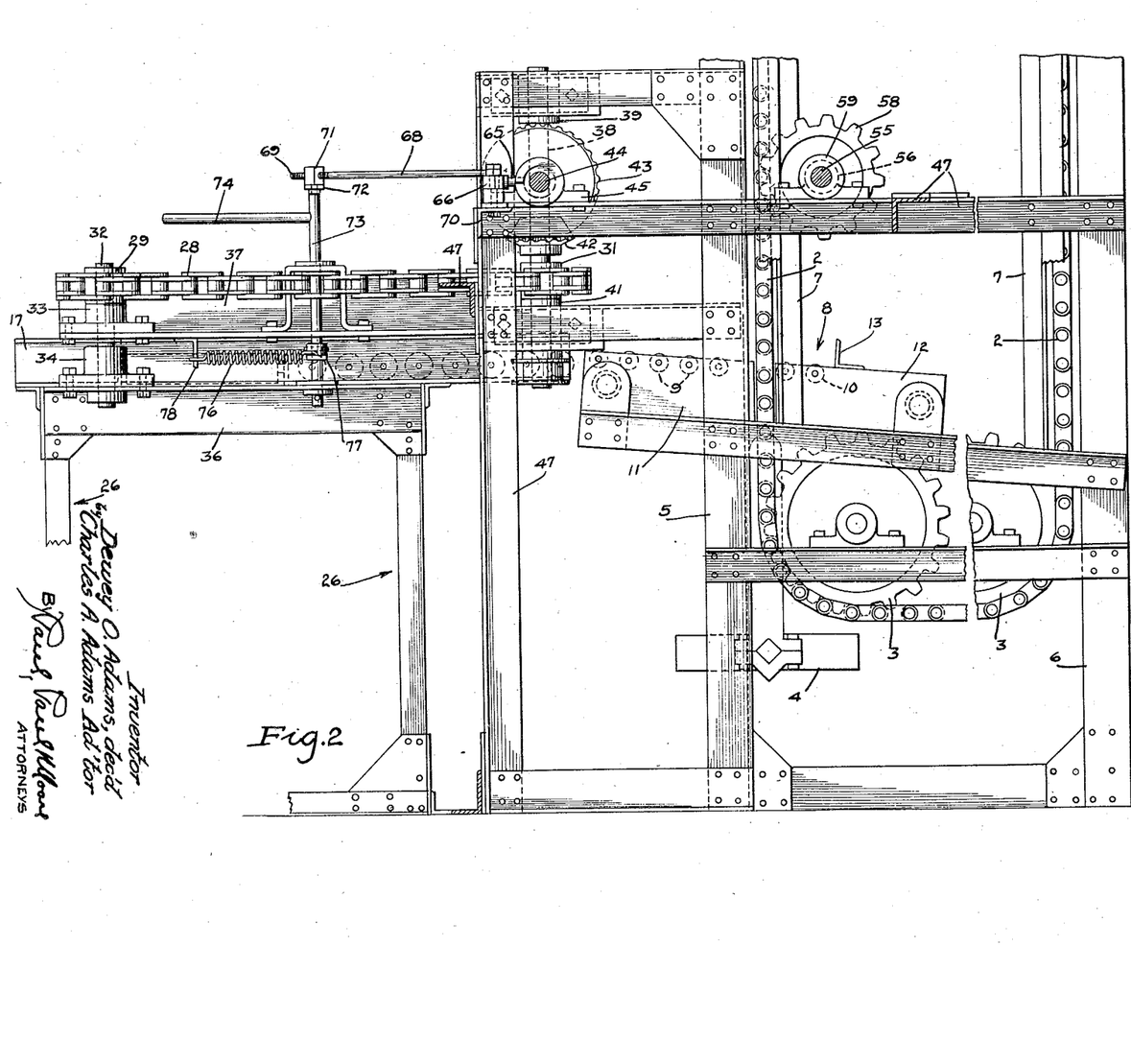
Figure 2 is a front elevation of Figure 1.
Figures 3, 4:
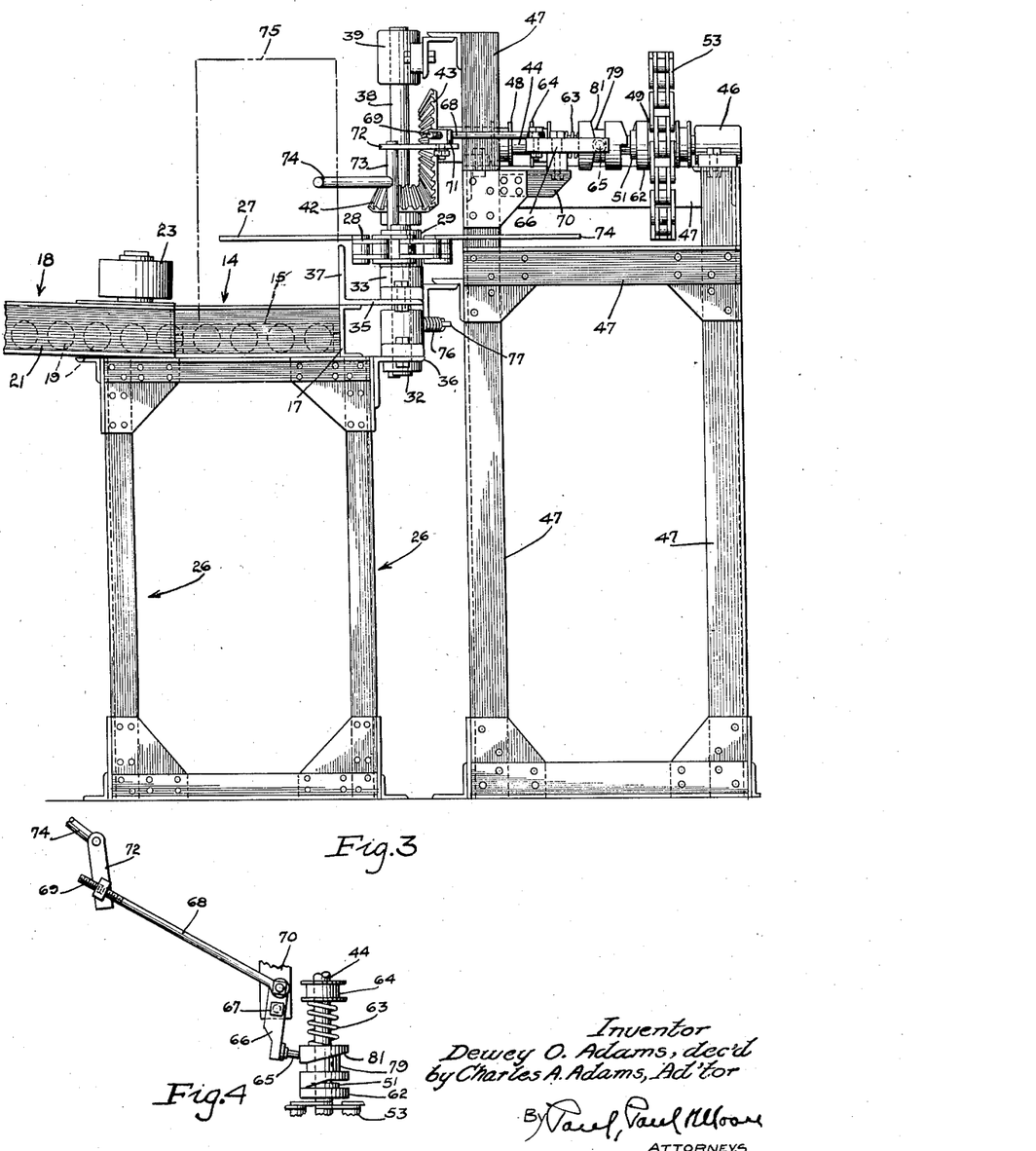
Figure 3 is an end elevation of Figure 1.
Figure 4 is a detail view showing the means for controlling the intermittent operation of the pushers, said means being shown in operative position.

The sprocket 31 is secured to a shaft 38 mounted in suitable bearings 39 and 41, as best shown in Figure 2. A beveled pinion 42 is also secured to the shaft 38 and meshes with a bevel gear 43 terminally secured to one end of a shaft 44 mounted in suitable bearings 45 and 46 supported upon a supporting structure or frame 47. A suitable collar 48 cooperates with the bevel gear 43 to prevent longitudinal movement of the shaft 44.

The means provided for driving the shaft 44 is best shown in Figures 1 and 2, and comprises a sprocket 49 loosely mounted upon the shaft 44 between collars 51 and 52 suitably secured to the shaft. A chain 53 connects the sprocket 49 with a relatively smaller sprocket wheel 54 secured to a drive shaft 55 mounted in suitable bearings 56 and 57, which also are secured to the supporting frame 47. A sprocket wheel 58 is secured to one end of the shaft 55 and is shown engaging the adjacent conveyer chain 2, as shown in Figure 2, whereby the shaft 55 will be rotated each time the conveyer chains 2—2 are operated. A collar 59 prevents longitudinal movement of the shaft 55.

The means for operatively connecting the shaft 44 with the constantly rotating sprocket 49 is best shown in Figures 1, 3, and 4, and comprises a clutch member 61 slidably mounted upon the shaft 44, and a complemental clutch member 62 secured to the hub of the sprocket wheel 49. A compression spring 63 is coiled about the shaft 44 and has one end seated against a collar 64, fixed to the shaft, and its opposite end engaged with the movable clutch member 61. The spring 63 constantly tends to move the clutch member 61 into driving engagement with the movable clutch member 62. A suitable feather key, not shown, is provided on the shaft 44 to prevent relative rotation of the clutch member 61 thereon.

The means for automatically actuating the clutch member 61 is shown comprising a suitable pin 65 carried by one end of an arm 66 pivoted at 67 to an extension 70 provided upon the supporting frame 47, as best shown in Figures 1 and 3. A connecting rod 68 has one end pivotally connected to the opposite end of the arm 66 and has its other end portion 69 received in threaded engagement with a head 71 pivotally mounted in one end of an arm 72, which is secured to an upright rock shaft 73 mounted in suitable bearings provided upon the structural frame 26. A trip finger 74 is suitably secured to the rock shaft 73 and is normally positioned to be engaged by the leading article 75, as shown in Figure 1. A suitable tension spring 76 has one end secured to an arm 77 mounted upon the rock shaft 73 and its opposite end connected with a small bracket 78 suitably secured to the supporting frame, as shown in Figure 2. This spring constantly tends to hold the above described parts in the positions shown in Figure 1.

The pin 65 of the arm 66 is normally positioned in an annular groove 79 provided in the clutch member 61 and is adapted to engage a cam face 81 provided in one wall of the groove whereby the clutch member may be longitudinally moved upon the shaft 44 in a direction against the action of the spring 63 to move it out of driving engagement with the constantly rotating clutch member 62, provided upon the hub of the sprocket 49.

In the operation of this novel feeding unit, the articles or commodities to be fed to the article receiving means are delivered to the feeding unit from a suitable source by means of the conveyer 18. As the leading article approaches the stop rail 37, it engages the trip finger 74 and oscillates it, whereupon the rock shaft 73 will be actuated, with the result that the connecting rod 68 will oscillate the arm 66 and move the pin 65 out of the groove 79 of the clutch member 61. As soon as the pin moves out of this groove, the spring 63 will move the clutch member 61 into driving engagement with its complemental clutch member 62, whereupon the shaft 44 will be rotated by reason of the slidable clutch member 61 being non-rotatably mounted upon the shaft. Such rotation of the shaft 44 will impart a similar movement to the upright shaft 38 with the resultant operation of the conveyer chain 28 and therefore the pusher blades 27. When the chain 28 is thus rotated, the pusher blade shown at the lower left hand corner of Figure 1, will engage the article 75 as indicated by the dotted lines in Figure 1, and move the article in a direction towards the elevator as indicated by the arrow, until the article is delivered onto the inclined conveyer rollers 9—9 and 10—10 of the receiving station 8, whereupon the article will move to the position indicated by the dotted lines in Figure 1 against the stops 13—13.

The article is fed onto the receiving station by one of the pusher blades 27 before the article-carrying member 4 reaches the station, so that when the latter passes through the station, it will engage and pick up the article and convey it to a higher elevation.

As soon as the article delivered to the feeding mechanism is moved out of engagement with the finger 74 by a pusher blade 27, the spring 76 will tend to return the finger 74 to its normal position, as shown in Figure 1 but, because of the pin 65 being held in engagement with the periphery of the clutch member 61, as shown in Figure 4, the finger cannot return to its normal position until the clutch member 61 has been rotated a portion of a revolution sufficient to cause the pin to drop into the groove 79, provided in the clutch member. As soon as the pin thus drops into the groove 79, it will engage the cam face 81, whereupon the clutch member 61 will be moved out of driving engagement with the clutch member 62 and will come to rest in substantially the position shown in Figure 1.

From the foregoing, it will be noted that the articles are automatically fed to the receiving station of the elevator because of the articles successively engaging the trip finger 74. It will also be noted that the feeding mechanism operates in timed relation with respect to the travel of the article-carrying members 4 of the elevator, so that an article can not be delivered onto the receiving station when a carrying member 4 is passing therethrough. The mechanism is so timed that an article to be delivered to the receiving station 8, will always be delivered thereto, when an article-carrying member is not passing through the station.

In the drawings, the invention has been shown applied to a vertical lift elevator, but it is to be understood that it may be used equally well in connection with various other types of receiving means such, for example, as a horizontal conveyer, an inclined conveyer, and various other types of receiving means. It may also be used for handling milk and ice cream cans, kegs, and various forms of cartons and box containers, without departing from the scope of the invention.

Figure 5:
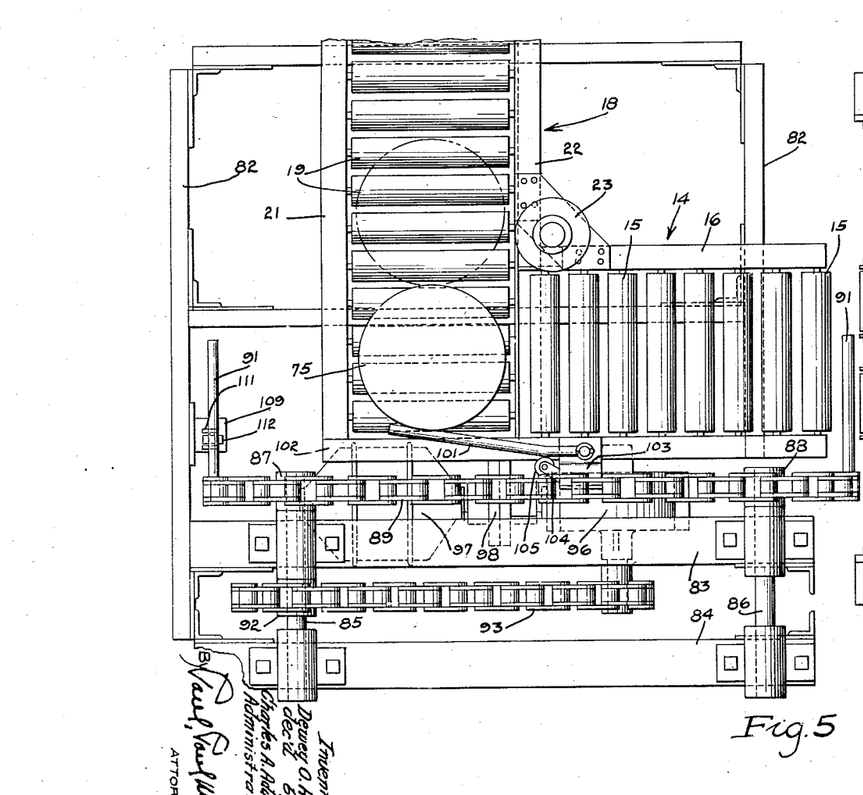
Figure 5 is a plan view showing another embodiment of the invention and wherein the feeding unit is electrically operated and controlled.
Figure 6:
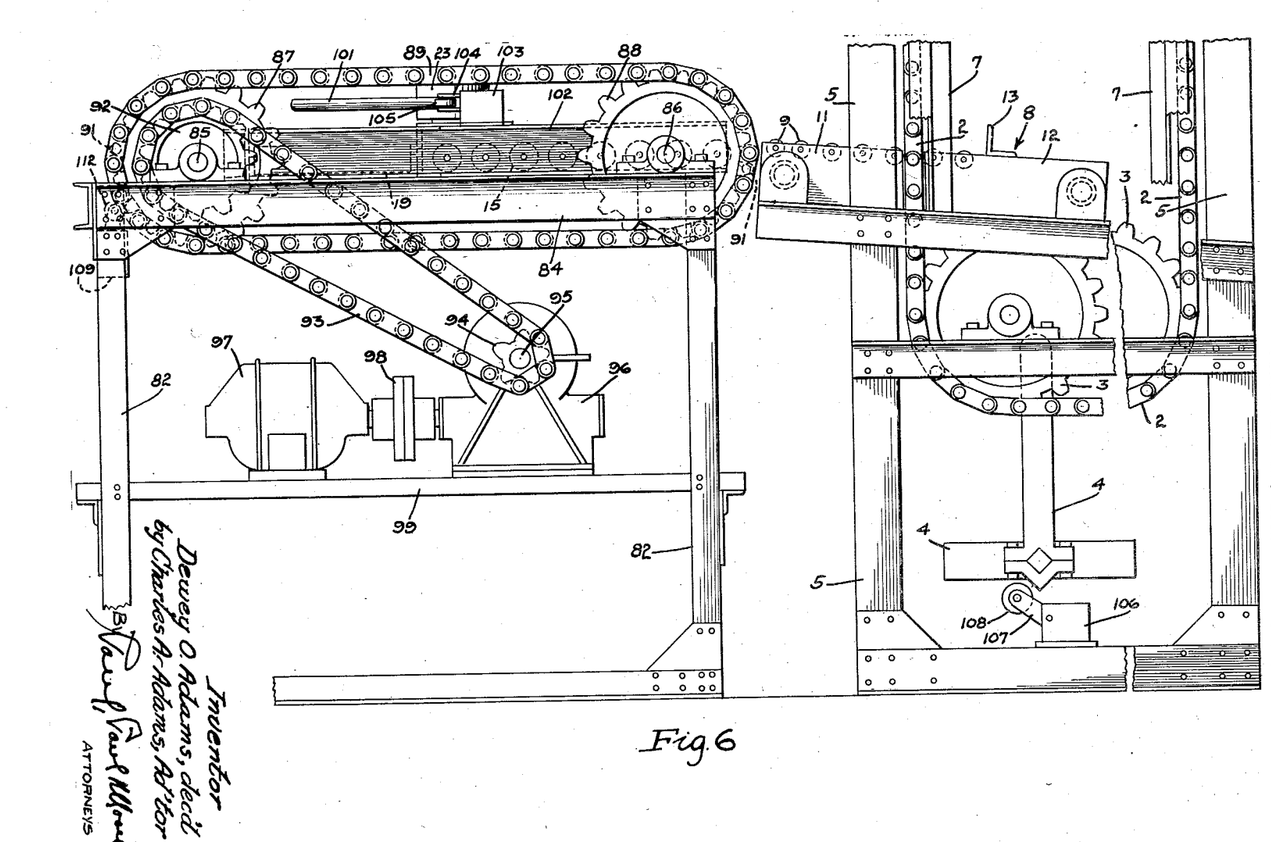
Figure 6 is an end view of Figure 5.
Figure 7:
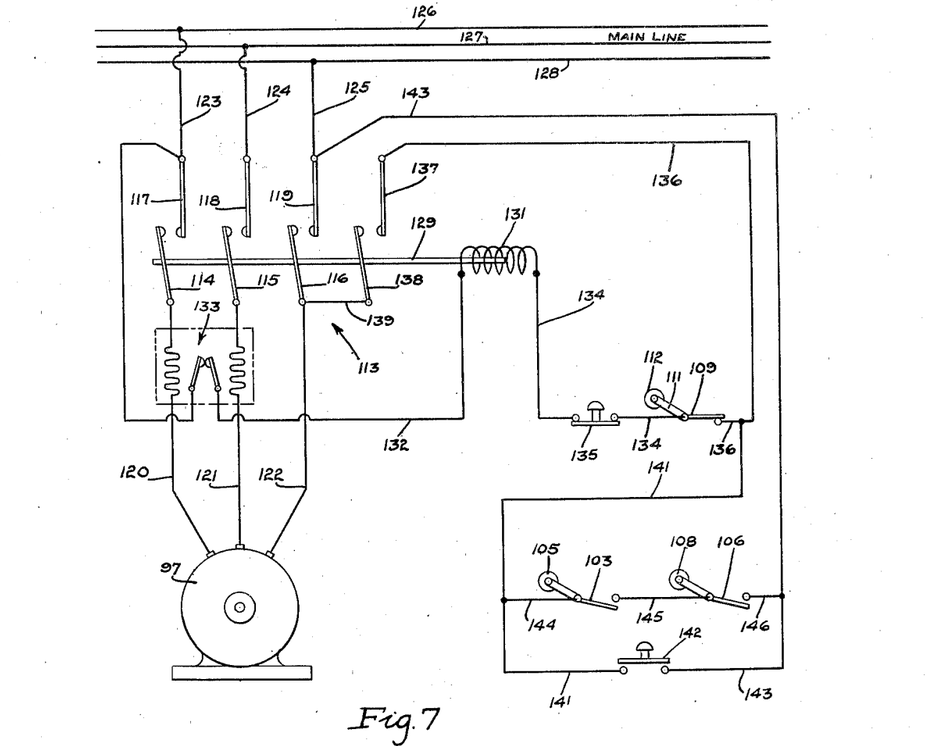
Figure 7 is a wiring diagram of the control means for the unit shown in Figures 5 and 6.

Figures 5, 6, and 7 show a construction wherein the feeding mechanism is adapted to be operated electrically, and is provided with an independent drive, the operation of which is controlled by movement of the article carrying member 4, operated by the conveyer chains 2—2. As here shown, the conveyer section 14 and the delivery conveyer 18 are mounted upon a suitable supporting frame 82 comprising a pair of spaced rails 83 and 84 upon which are mounted shafts 85 and 86. These shafts are supported in suitable bearings secured to the rails 83 and 84 as shown in Figure 5. Sprockets 87 and 88 are secured to the shafts 85 and 86, respectively, and support a conveyer chain 89 to which are secured two pusher rods 91 which are adapted to travel over the discharge end of the delivery conveyer 18, and also over the conveyer section 14 of the feeding mechanism, as will be understood by reference to Figure 5. A relatively smaller sprocket 92 is shown secured to the shaft 85 between the rails 83 and 84 and has a chain 93 connecting it with a drive sprocket 94 secured to a shaft 95 of a suitable gear reducer 96, as shown in Figure 6. The gear reducer is shown operatively connected with a motor 97 by means of a suitable coupling 98. The motor 97 and gear reducer 96 may be supported upon a suitable platform 99 provided upon the structural frame 82.

A trip finger 101 is pivotally mounted upon the side rail 102 of the conveyer section 14, whereby it may be engaged by an approaching article, as shown in Figure 5. The side rail 102 provides a stop for the articles delivered to the feeding mechanism from the conveyer 18, in a manner similar to the rail 37 shown in Figures 1, 2, and 3.

A suitable switch 103 is secured to the side rail 102 and has an arm 104 which carries a roller 105 adapted to be engaged by the trip finger 101, when the latter is actuated by an article as will be understood by reference to Figure 5.

A similar switch 106 is mounted upon the lower portion of the supporting frame of the elevator, as shown at the right hand side of Figure 6. This switch has an arm 107 carrying a roller 108 positioned to be engaged by the lower portion of the article-carrying member 4, when the latter is in substantially the position shown in Figure 6.

A third and similar switch 109 is secured to the supporting frame 82 of the feeding unit, as shown at the left hand side of Figures 5 and 6. This switch, in like manner, has a pivoted arm 111 carrying a roller 112 positioned to be engaged by the pusher rods 91, as they pass around the sprocket 87. The three switches above described control the operation of the feeding unit.

The switches are electrically connected to the main operating switch of the motor as shown in Figure 7. The motor switch is indicated generally by the numeral 113, and comprises movable contacts 114, 115, and 116 adapted to electrically engage fixed contacts 117, 118, and 119, respectively. The movable contacts are connected to the motor 97 by wires 120, 121, and 122, and the fixed contacts of the motor switch are connected by wires 123, 124, and 125 to the main line conductors 126, 127 and 128, respectively. An actuator 129 is operatively connected with the movable contacts of the motor switch and is adapted to be actuated by a suitable coil having a wire 132 connecting one end thereof with the wire 123 through a conventional thermal overload relay 133. The other end of the coil 131 is connected by a wire 134 to one side of an emergency stop switch 135, the other side of which is connected to one side of the control switch 109. The wire 136 connects the other side of the switch 109 with a fixed contact 137 adapted to be engaged by a movable contact 138 also operatively connected with the actuator 129. A wire 139 connects the movable contact 138 with the movable contact 116 of the motor switch.

A wire 141 connects the wire 136 with one side of a suitable starting switch 142, the other side of which is connected by a wire 143 to the fixed contact 119 of the motor switch.

The control switches 103 and 106 are shown connected in series between the wires 141 and 143 by suitable connections 144, 145, and 146.

In the operation of the feeding mechanism shown in Figures 5, 6, and 7, the articles are delivered to the conveyer section 14 of the unit by means of the conveyer 18 in a manner similar to that shown and described with reference to Figures 1, 2, and 3. When the approaching article engages the trip finger 101, the latter will actuate the switch 103 and close it. Following this operation, the article-carrying member 4 will engage the roller 108 of the switch 106 and depress its arm whereby a circuit is completed through the coil 131 with the result that the actuator 129 will be operated to close the motor switch. Upon closing of the motor switch, the motor is started with the result that the chain 89 is operated to move the pusher rod at the left hand side of the structure, when viewed as shown in Figure 5, into engagement with the article engaged with the trip finger. The article is then moved out from the conveyer 18 onto the conveyer section 14 from which it is discharged onto the conveyer rollers 9—9 and 10—10 of the receiving station 8 of the elevator. At about the time that the article is discharged from the coneveyer section 14 onto the receiving station, the other pusher rod will engage the roller 112 of the switch 109 and open this switch whereby the circuit is opened to the coil 131. Upon deenergization of the coil 131, the actuator 129 will return to the position shown in Figure 7, thereby temporarily interrupting the motor and further movement of the chain 89 carrying the pusher rods 91.

By reference to Figure 6, it will be noted that the switch 106 is only momentarily closed, when engaged by the article-carrying member 4, because the latter normally continues in its travel towards the receiving station. To maintan a closed circuit to the coil 131, after this circuit has been temporarily closed by operation of the switches 103 and 106, a holding circuit is provided for the coil 131 so that this coil will remain energized during the time that the article carrying member travels from the position shown in Figure 6, through the receiving station 8 of the elevator.

Such means is shown in Figure 7 and resides in the provision of the contacts 137 and 138 which, as hereinbefore stated, are adapted to be closed by movement of the actuator 129 simultaneously as the motor switch is closed. By reference to Figure 7, it will be noted that when the contacts 137 and 138 are in circuit closing position, current will flow from the conductor 125 through the motor contacts 119 and 116, wire 139, contacts 138 and 137, wire 136, and switch 109, which normally is held in closed position by suitable means, not shown. From the switch 109, the current flows through the wire 134 and emergency stop switch 135, thence through the coil 131, wire 132, and through the thermal overload relay 133, and back to the conductor 123 which is connected with the main line. Current will continue to flow through the coil 131 until one of the pusher rods engages the roller 112 and opens the switch 109, whereupon the coil 131 is deenergized and the motor switch 113 opened.

It will thus be seen that the control switches 103, 106, and 109 are so arranged that the operation of the feeding unit is entirely automatic. When one of the pusher rods 91 engages the roller 112 of the switch 109 and the circuit is opened to the coil 131, the momentum of the motor and the moving parts connected therewith is sufficient to cause the pusher rod 91, which has actuated the switch 109, to pass the roller 112 a distance sufficient to permit the roller to return to its normal circuit-closing position. It is to be understood that a suitable spring not shown, is provided for returning the trip finger 101 to its normal position shown in Figure 5. In the drawings, the roller of the switch 103 has been shown engaged with the trip finger 101, whereby the latter will be depressed, causing the switch 103 to be closed. The control switches 103, 106, and 109 are of ordinary well-known construction and it is therefore thought unnecessary to show the same in detail, it being understood that they are provided with suitable springs for holding their operating arms in their normal positions.

In order to render the apparatus more flexible in operation, the emergency stop switch 135 is provided, whereby the operator may, at any time, interrupt the feeding operation of the feeding unit. When this switch, which preferably is of the push button normally closed type, is operated, the circuit through the coil 131 will be opened, whereupon the motor switch will open and cause the motor to stop.

The starting switch 142 provided between the wires 141 and 143, as shown in the wiring diagram, may also be of the push button type, but normally is in circuit-opening position. By means of this switch, the operator may cause the feeding mechanism to go through a cycle of operation when it is empty of articles. The push switches 135 and 142 thus provide means whereby the feeding unit may be manually controlled when desired.

The electrically controlled and operated feeding unit disclosed in Figures 5, 6, and 7 is substantially the same as the mechanically operated unit disclosed in Figures 1, 2, and 3. In each construction, however, the feeding unit operates in timed relation to the travel of the article carrying members 4, so that but a single article is delivered onto the receiving station of the conveying means at a time, thereby positively preventing congestion of the conveying system at this point. If the articles are to be delivered from the feeding mechanism onto a horizontally disposed or inclined conveyer or any other suitable receiving means, the operation of the feeding mechanism will be substantially the same as that disclosed in the drawings, it being understood, of course, that means must be provided upon the receiving conveyer for controlling the operation of the feeding unit or mechanism so that it will operate in timed relation with respect thereto.

What is claimed is:—

1. The combination with a conveying system comprising a power driven conveyer, of a mechanism for feeding articles to said conveyer, said mechanism comprising a movable member having means thereon for engaging articles on said mechanism and delivering them to the conveyer, a normally inoperative drive for said mechanism, a device for operatively connecting said drive to said conveyer, and means associated with said device and positioned to be actuated by articles delivered onto said feeding mechanism to control the operation of said movable member.

2. The combination with a conveying system comprising a conveyer and a driving means therefor, of a mechanism for delivering articles to a position to be engaged by said conveyer, said mechanism comprising means adapted to receive and support articles, an endless chain mounted adjacent to said supporting means and having pushers adapted to engage and feed the articles from said supporting means, one at a time, to said conveyer, a drive for said chain including a device for operatively connecting the chain to said driving means, and means adapted to be engaged by articles delivered to said supporting means for controlling the operation of said device.

3. The combination with a conveying system comprising a power operated conveyer, of a mechanism for feeding articles to said conveyer, said mechanism comprising a conveyer section adapted to receive articles to be conveyed, an endless chain having pushers secured thereto and adapted to engage articles delivered to said feeding mechanism and feed them to the conveyer, a device for operatively connecting said chain with the driving means of the conveyer, and means engageable with the articles for automatically controlling the operation of said device whereby said pushers will operate in timed relation to the travel of the conveyer.

4. In a conveying system, a receiving station, a conveyer passing through said station, a feeding unit for delivering articles, one at a time, to said station, an independent drive for said unit, and a control means for said drive comprising a plurality of limit switches, one of which is positioned to be actuated by articles delivered to said unit to control the operation of said drive.

5. In a conveying system, a receiving station, a conveyer passing through said station, an automatic feeding unit for delivering articles to said station, an independent drive for said unit including an electric circuit, a control switch in said circuit positioned to be actuated by an article delivered to said unit to condition said drive for operation, and means associated with said switch and said drive and positioned to be actuated by the conveyer to cause said drive to operate said unit.

6. In a conveying system, a receiving station, a conveyer passing through said station, a feeding unit for delivering articles to said station whereby they may be picked up by the conveyer, a driving means for said feeding unit, a control switch positioned to be engaged by an article delivered to the feeding unit whereby said unit is conditioned for operation, and a second control switch electrically connected with said first mentioned control switch and positioned to be actuated by the conveyer, whereby said driving means will operate and cause said feeding unit to deliver an article to said station.

7. In a conveying system, a receiving station, a conveyer passing through said station, a feeding unit for delivering articles one at a time to said station whereby they may be picked up by the conveyer, an independent electric drive for said feeding unit comprising a circuit, a control switch in said circuit positioned to be engaged by an article delivered to the feeding unit whereby said switch may be closed thereby and the circuit conditioned for operation, and a second control switch electrically connected with said first mentioned switch and positioned to be actuated by said conveyer, whereby a circuit is completed to said driving means, causing said feeding unit to operate to deliver an article to said station.

8. In a conveying system, a receiving station, a conveyer passing through said station and adapted to pick up articles delivered thereto, a feeding unit for feeding articles to said station, said unit comprising a plurality of pushers adapted to engage articles delivered thereto and feed them onto the station, a driving means for said unit, a motor and a circuit therefor, a control switch in said circuit positioned to be engaged by an article delivered to said feeding unit and whereby the circuit is partially completed to the motor, a second control switch adapted to be actuated at a predetermined time by the conveyer whereby the circuit is completed, causing the motor to operate and actuate said pushers to deliver an article to the conveyer, and a third control switch positioned to be engaged by one of said pushers for automatically interrupting the operation of the feeding unit.

9. In a conveying system, a receiving station, a power driven conveyer passing through said station and adapted to receive articles delivered thereto, a delivery conveyer, a feeding mechanism interposed between said delivery conveyer and said receiving station, a drive for said feeding mechanism, and a control means operatively associated with said drive and with said power driven conveyer and positioned to be actuated by articles delivered to said feeding mechanism, whereby the operation of said driven conveyer will effect driving movement of said mechanism.

10. In a conveying system, a conveyer adapted for continuous operation, a mechanism for feeding articles onto said conveyer, means for delivering articles to said mechanism, said mechanism comprising a member having means for engaging articles delivered thereto and feeding them to said conveyer, one at a time, a normally inoperative drive for said member, and a control element for said drive positioned to be engaged by articles delivered to said mechanism and thereby render said drive operative to actuate said member, each time an article is delivered onto said feeding mechanism.

11. In a conveying system, a conveyer adapted for continuous operation, a mechanism for feeding articles, one at a time, to said conveyer, an independent drive for said mechanism, and a control means for said drive comprising a control element positioned to be actuated by the delivery of articles onto said mechanism and a second control element adapted to be actuated by the conveyer whereby the drive is rendered operative to feed an article onto said conveyer.

CHARLES A. ADAMS,
*Administrator of the Estate of Dewey O. Adams, Deceased.*